United States Patent [19]
Hayakawa

[11] Patent Number: 5,935,267
[45] Date of Patent: Aug. 10, 1999

[54] DATA COMMUNICATION METHOD AND A DATA COMMUNICATION SYSTEM FOR USE WITH A DIGITAL NETWORK

[75] Inventor: Toshiaki Hayakawa, Miyagi, Japan

[73] Assignee: Fuji Photo Film Co., Ltd., Kanagawa, Japan

[21] Appl. No.: 08/831,666

[22] Filed: Apr. 9, 1997

[30] Foreign Application Priority Data

Apr. 12, 1996 [JP] Japan .................................. 8-091326
May 8, 1996 [JP] Japan .................................. 8-114001

[51] Int. Cl.$^6$ .................................................. G08C 25/02
[52] U.S. Cl. ....................... 714/748; 714/746; 714/747; 714/749; 370/216; 370/245
[58] Field of Search ..................... 371/32, 33; 370/216, 370/245, 461, 449, 522; 395/123, 181; 379/398, 395; 714/746, 747, 748, 749

[56] References Cited

U.S. PATENT DOCUMENTS 5,426,638  6/1995  Maruyama et al. .................... 370/85.4
5,497,374  3/1996  Maruyama et al. .................... 370/85.4

*Primary Examiner*—William Grant
*Assistant Examiner*—McDieunel Marc
*Attorney, Agent, or Firm*—Sughrue, Mion, Zinn, Macpeak & Seas, PLLC

[57] ABSTRACT

Transmission and reception nodes are connected to a communication network to be controlled with respect to time according to bus time as time information shared therebetween. The transmission node periodically transmits data while keeping a predetermined free period of time. The reception node decides normality of data received. At detection of abnormality in reception, the reception node transmits during the free period of time a re-transmission request signal to the transmission node with specification of information identifying the bus time of the abnormal data reception. On receiving the re-transmission request signal, the transmission node obtains the data transmitted at the bus time identified by the information specified by the re-transmission request signal and then re-transmits the data during the free period of time to the reception node.

11 Claims, 14 Drawing Sheets

BUFFER MEMORY IN TRANSMISSION NODE

DATA COMMUNICATION METHOD AND A DATA COMMUNICATION SYSTEM FOR USE WITH A DIGITAL NETWORK

BACKGROUND OF THE INVENTION

1. Field of the Invention

The present invention relates to digital communication, and in particular, to a technology for guaranteeing data communicated.

2. Description of the Related Art

Conventional video and audio apparatuses include input and output terminals for analog signals such that video and audio signals communicated between such apparatuses are represented in an analog format.

Recently, digital communication is coming to wide use in place of the analog communication. In this field, IEEE1394 has been known as a representative standard for the digital communication.

FIG. 16 shows an example of an isochronous communication stipulated by IEEE1394.

The isochronous communication is synchronous communication in which one packet is transferred for each cycle of time T (=125 microseconds ($\mu$s)). During the cycle, a cycle start packet SP is supplied to a bus and then a data packet including a packet header PH and a data field DT is fed thereto in a successive fashion.

The cycle start packet SP includes a signal to enable communication to be started and is supplied to the bus from a root node of a communication network including a common bus to which a plurality of nodes are connected. Detecting an event that the cycle start packet SP is supplied to the bus, each node feeds a data packet including a packet header PH and a data field DT to the bus without specifying its communication partner. Stored in the packet header PH are information items such as a data length of data field DT. In the data field DT, there is stored data as an object of communication, e.g., a video signal.

In the isochronous communication, a predetermined bandwidth is reserved at an interval of time T and hence data can be communicated in a realtime fashion. When the cycle start packet SP is detected by a node on the transmission side, the node delivers a data packet to the bus in a broadcast manner without designating the destination of communication. Nodes on the reception side acquires, when necessary, the data packet supplied to the bus. The transmitting node only sends the data packet, i.e., cannot recognize whether or not the data packet has been normally received by nodes on the reception side.

The isochronous communication is a kind of synchronous communication in which the normality of data communicated is not basically guaranteed. Data transmitted from a node on the transmission side is equivalent to a broadcast message, namely, there is not achieved any handshake by the transmitting node. Therefore, the transmitting node cannot confirm whether or not the communication partner has normally received the data.

However, for example, when compressed video data is to be communicated, a missing data item or a data item changed may possibly cause a fatal damage to the quality of data and hence there is desired means for guaranteeing the normality of communicated data. In the isochronous communication, since it is impossible to recognize occurrence of communication errors, the normality of data cannot be guaranteed.

Subsequently, description will be given of a method of specifying a data length of the data field DT. According to the IEEE1394 standard, the maximum length of transmission data is required to be designated in advance. Assume that the maximum length is set as ten bytes.

In FIG. 17A, after a cycle start packet SP is sent at time t1, there is transmitted a data packet including a packet header PH in which information indicating the maximum data length (ten bytes) is stored in its data length field and a data field DT of the maximum data length (ten bytes). The data to be transmitted is once accumulated in a buffer before the transmission thereof such that the first ten-byte data (of the maximum length) is stored in the data field DT for transmission.

Similarly, after a cycle start packet SP is sent at time t2, there is transmitted a data packet including a packet header PH in which information indicating the maximum data length (ten bytes) is stored in its data length field and a data field DT in which the first ten-byte data (of the maximum length) obtained from the transmission data remaining in the buffer is stored. This also applies to the operation after transmission of a cycle start packet SP at time t3.

FIG. 17B shows a case in which the data length indicated by the packet header PH varies from that of the data field DT.

After each of the cycle start packets SP sent at points of time t1 and t3, the data length indicated by the packet header PH is equal to that of the data field DT. However, after the transmission of cycle start packet SP at time t2, the data length contained in the packet header PH indicates the maximum data length (ten bytes) and the data length of data field DT is nine bytes. Namely, these data lengths are different from each other. This takes place for the following reasons.

In accordance with the IEEE1394 standard, the communication interface facility automatically generates a packet header PH indicating the maximum data length (ten bytes) in the data length field. After the creation of packet header PH, data items may be sequentially accumulated in the buffer depending on cases. Consequently, assuming that there is accumulated in the buffer a data item having a length equal to at least ten bytes (maximum data length), the interface facility produces the packet header PH indicating the maximum data length (ten bytes). However, in practice, there possibly occurs a case in which only a nine-byte data item is accumulated in the buffer. In this situation, although the data length field of packet header PH specifies the maximum data length (ten bytes), it is only possible to transmit nine-byte data item. This causes mismatching in data length.

When the data is transmitted regardless of the state of mismatching, the reception side of the pertinent data detects a communication error. As a result, the normal communication cannot be guaranteed in this case. To overcome this difficulty, the communication is carried out, for example, as follows.

FIG. 17C shows another example of data communication.

After a cycle start packet SP is sent at time t1, when data having a length equal to or more than the maximum data length (ten bytes) is accumulated in the buffer, there is transmitted a data packet including a packet header PH having a data length field indicating the maximum data length (ten bytes) and a data field DT in which the first ten-byte data item (of the maximum length) obtained from the data remaining in the buffer is stored.

After transmission of a cycle start packet SP at time t2, when the data accumulated in the buffer is less than the maximum data length (ten bytes), transmission of data is not conducted. Namely, the data is kept remained in the buffer.

After transmission of a cycle start packet SP at time t3, when data having a length equal to or more than the maximum data length (ten bytes) is accumulated in the buffer, there is transmitted a data packet including a packet header PH having a data length field indicating the maximum data length (ten bytes) and a data field DT containing the first ten-byte data item (of the maximum length) obtained from the data remaining in the buffer.

According to the communication described above, since the data length denoted by the packet header PH is equal to that of data stored in the data field DT, the normal communication can be carried out. However, the data the length of which is less than the maximum data length (ten bytes), which is inherently required to be sent immediately after time t2, is transmitted only after time t3. This therefore becomes a characteristic defect in association with the realtime communication.

In accordance with the IEEE1394 standard, when the maximum data length is determined in advance, the maximum data length is automatically stored in the data length field of the packet header PH. However, When the data accumulated in the buffer has a length less than the maximum data length, the data length written in the packet header PH is unequal to that of data stored in the data field DT. When the transmission of data is forcibly conducted in this case, the normal communication cannot be guaranteed.

Additionally, when the data transmission is effected only after the data length of data accumulated in the buffer becomes equal to or more than the maximum data length, there appears the defect deteriorating the realtime characteristic of the communication.

SUMMARY OF THE INVENTION

This application is based on JP patent application number Hei 8-91326 filed on Apr. 12, 1997 and Hei 8-114001 filed on May 8, 1997, the entire contents of which are incorporated herein by reference.

It is therefore an object of the present invention to provide a data guaranteeing method and a data guaranteeing system in which the normality of the contents of data to be synchronously communicated can be guaranteed without interrupting the communication.

Another object of the present invention is to provide a data communication method and a data communication system in which the normal communication can be guaranteed without deteriorating the realtime characteristic of communication.

According to one aspect of the present invention, there is provided a data communication method for use with a communication network including transmission nodes and reception nodes connected thereto in which the transmission and reception nodes are controlled with respect to time according to bus time as time information shared between the transmission and reception nodes, comprising the steps of periodically transmitting by the transmission node data therefrom while keeping by the transmission node a free period of time, deciding by the reception node normality of data received by the reception node, transmitting by the reception node during the free period of time from the reception node to the transmission node, when abnormality of reception is decided in the process of deciding the normality, a re-transmission request signal with specification of information identifying bus time of the abnormal data reception, and transmitting by the transmission node during the free period of time from the transmission node to the reception node, when the re-transmission request signal is received by the transmission node, data transmitted in the bus time identified by the information specified by the re-transmission request signal.

Since data for which abnormality of reception is detected is re-transmitted, the normality of data can be guaranteed. Moreover, the signals requesting the re-transmission and those of re-transmission data are sent during an idle or free period of time not used for other operations and hence the data re-transmission can be conducted without reducing the bandwidth originally or inherently assigned to the periodic data transfer.

According to another aspect of the present invention, there is provided a data transmission method, comprising the step of repeatedly conducting the steps of transferring to a buffer memory a portion of a consecutive data string to be transmitted and sequentially transmitting the data string transferred to the buffer memory. The step of transferring the data string to the buffer memory includes the sub-step of transferring a portion of the data string to be transmitted, a portion of the data string last transmitted being kept remained in the buffer memory.

A portion of data last transmitted is kept remained in the buffer memory. When a data re-transmission request is issued, the requested data is obtained from the buffer memory for the re-transmission. Therefore, when a re-transmission request is issued, the pertinent data can be immediately re-transmitted.

According to another aspect of the present invention, there is provided a data transmission method for use with a digital communication network for establishing connections between transmission nodes for transmitting data and reception nodes for receiving the transmitted data, comprising the steps of transmitting by the transmission node data from the transmission node according to a protocol in a synchronous mode and accumulating by the transmission node transmitted data in a buffer memory; acquiring, when the transmitted data cannot be normally received by the reception node, time information at the abnormal reception, mapping the time information onto address information; and returning the address information to the transmission node according to a protocol in an asynchronous mode, thereby requesting re-transmission of the data not normally received; and reading by the transmission node, when the address information is received by the transmission node, data from the buffer memory according to the address information and re-transmitting the obtained data to the reception data according to a protocol in an asynchronous mode.

Moreover, according to another aspect of the present invention, there is provided a data communication method for use with a reception node for receiving data in a digital communication network, comprising the step of acquiring, when data transmitted from an external apparatus according to a protocol in a synchronous mode is not normally received by the reception node, time information at the abnormal reception, mapping the time information onto address information, and returning the address information according to a protocol in an asynchronous mode, thereby requesting re-transmission of the data not normally received.

According to another aspect of the present invention, there is provided a data communication system for digital communication, comprising a circuit for transmitting data according to a protocol in a synchronous mode and accumulating the transmitted data in a buffer memory; a circuit for reading, when a re-transmission request including address information is received from an external apparatus, data from the buffer memory according to the address information, receiving a circuit for receiving data according to the address information, and a circuit for acquiring, when data is not normally received by the receiving a circuit, time information at the abnormal reception, mapping the time information onto address information, and returning to the external apparatus the address information according to a protocol in an asynchronous mode, thereby requesting re-transmission of the data not normally received.

In addition, according to the present invention, there is provided a data communication system for digital communication, comprising a receiving section for receiving data according to the address information and section for acquiring, when data is not normally received by the receiving section, time information at the abnormal reception, mapping the time information onto address information, and returning the address information according to a protocol in an asynchronous mode, thereby requesting re-transmission of the data not normally received.

Setting a state in which a mapping operation is conducted between information of time and information of addresses, data sent from a transmission node is stored in a predetermined address information. When data is not normally received, the reception node specifies for re-transmission thereof the pertinent address, not the serial number of transmitted data.

Furthermore, the re-transmission request and the re-transmission are accomplished according to an asynchronous protocol, the data can be guaranteed without interrupting communication of the synchronous protocol.

According to further another aspect of the present invention, there is provided a data communication system, comprising a buffer memory for buffering data to be transmitted, header generating section for generating in a data length field a header in which a first data length is described, timing detecting means for detecting a timing signal supplied at a predetermined interval of time; data length detecting means for detecting, when the timing signal is detected, a data length of data buffered in the buffer memory, the data length being detected as a second data length; header transmitting means for converting, when the second data length thus detected is less than the first data length, a value of the data length field of the header generated by the header generating means into a data length equal to or less than the second data length and transmitting, when the second data length thus detected is equal to or more than the first data length, the header generated by the header generating means without converting the value thereof; and data transmitting means for obtaining from the buffer memory data having a data length equal to that described in the data length field of the transmitted header and transmitting the data.

When the second data length is equal to or more than the first data length, the header is transmitted without altering the data length field of the generated header. Data having the length thus indicated by the header is obtained from the buffer for transmission. When the second data length is less than the first data length, the second data length is written in the data length field of the header such that data having the second data length is attained from the buffer for transmission. In either cases, the data length of the header is equal to that of the transmission data. Additionally, even when the data length of data accumulated in the buffer is less than the first data length, the data can be immediately transmitted before the data length reaches the first data length. This consequently guarantees the inherent characteristic of the realtime communication.

According to still another aspect of the present invention, there is provided a data communication method, comprising the steps of generating a header including a data length field in which a first data length is described; detecting, each time a timing signal supplied at a predetermined interval of time is detected, a data length of data buffered in a buffer memory, the data length being detected as a second data length; converting, when the second data length thus detected is less than the first data length, a value of the data length field of the generated header into a data length equal to or less than the second data length and transmitting, when the second data length thus detected is equal to or more than the first data length, the generated header without converting the value thereof; and obtaining from the buffer memory data having a data length equal to that described in the data length field of the transmitted header and transmitting the data.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 2:
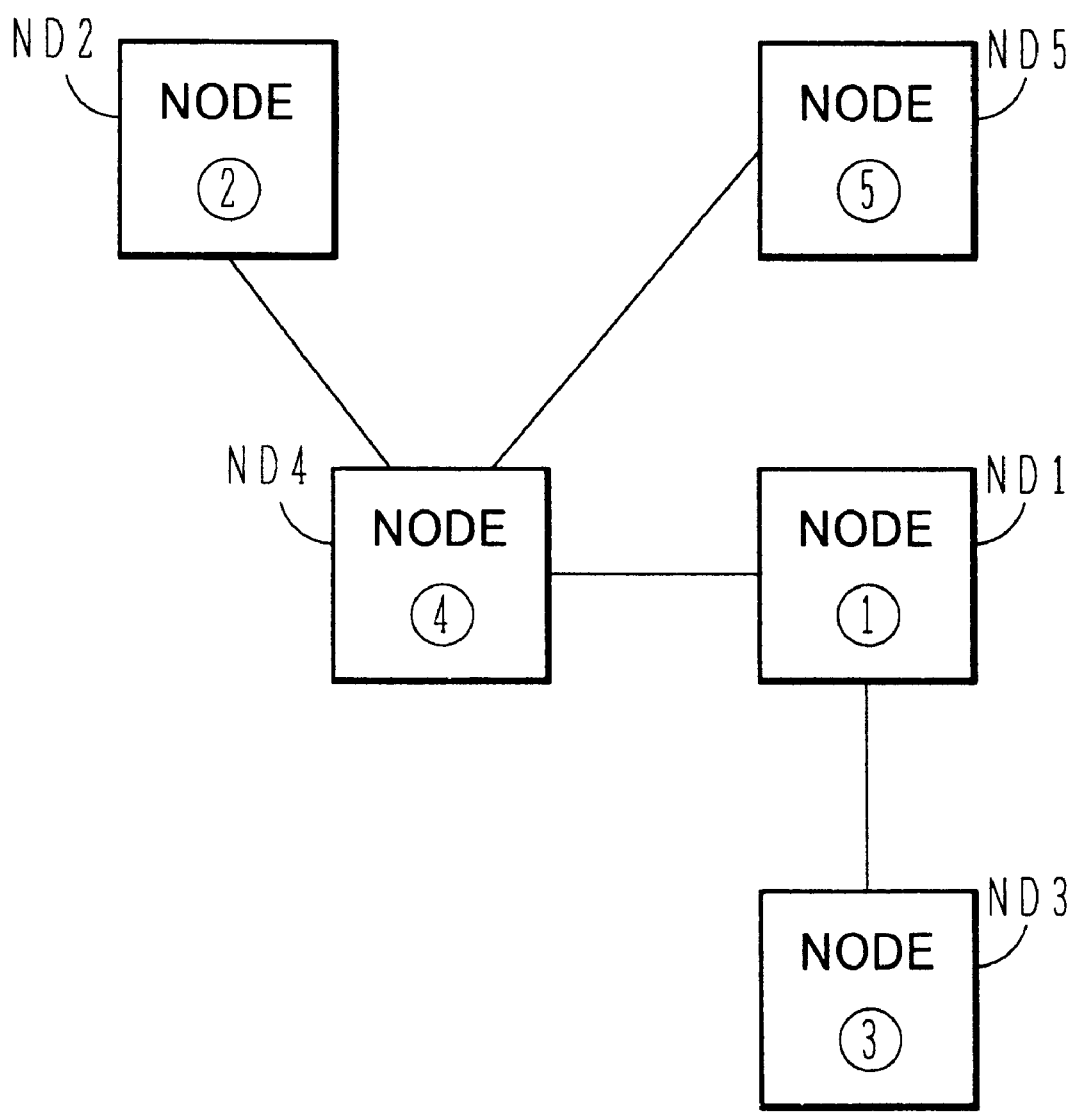
FIG. 2 is a block diagram showing a configuration example of the communication network conforming to the IEEE1394 standard.

FIG. 2 shows the configuration of a communication network conforming to the IEEE1394 standard in an embodiment of according to the present invention.

The network includes, for example, five nodes (communication apparatuses) ND1 to ND5 connected to a common bus. Each nodes ND is assigned with a node identifier (ID). For example, nodes ND1 to ND5 are assigned with identifiers "1" to "5", respectively. A node having the largest value of edentifier is set as a root node. In the configuration of FIG. 2, the node ND5 is employed as the root node.

Figure 3:
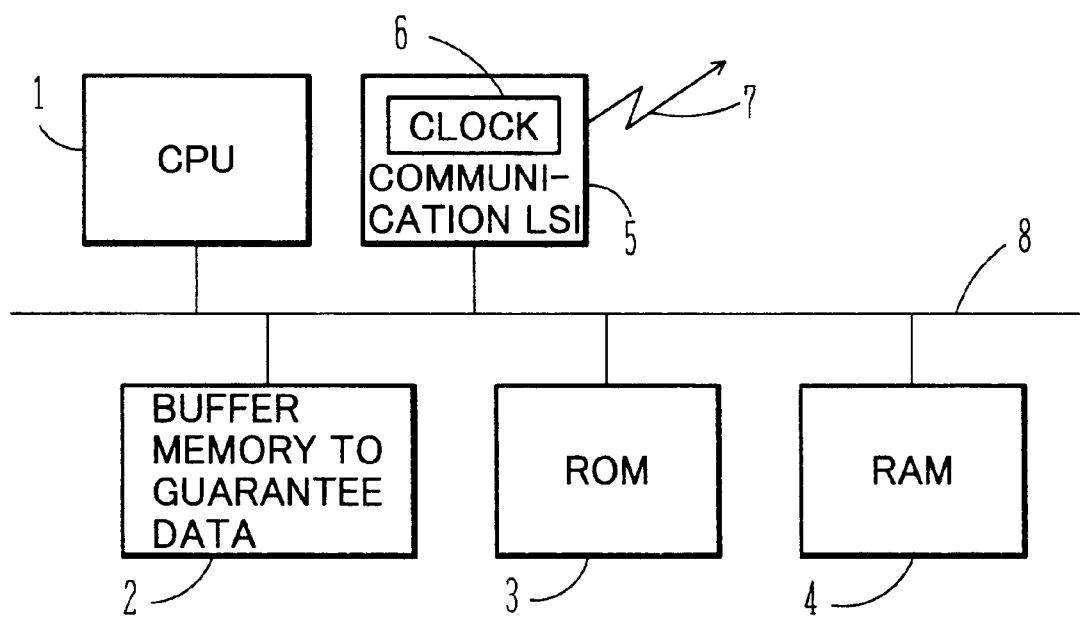
FIG. 3 is a block diagram showing a configuration example of one of the five nodes shown in FIG. 2.

FIG. 3 illustrates a block diagram of five nodes of FIG. 2.

The node includes a large scale integrated (LSI) circuit 5 for communication to conduct processing related to communication, a central processing unit (CPU) 1, a read-only memory (ROM) 3, a random access memory 4 (RAM), and a buffer memory 2, which are connected via a local bus 8 to each other.

In the ROM 3, there are stored various parameters and computer programs. The CPU 1 accomplishes arithmetic and logic operations as well as control operations according to computer programs stored in the ROM 3. The RAM 4 includes a working memory of the CPU 1, the memory including registers and buffers. The buffer memory 2 and the RAM 4 may be implemented in one memory device.

The communication LSI 5 includes a clock generator circuit 6 for measuring the bus time and a communication connector 7 for connecting the node to another node. The bus time is measured basically according to the clock generator 6 unique to the pertinent node. However, the bus time is adopted as information of time shared among all nodes connected to the network and hence is modified to match the bus time of the root node for each cycle of isochronous communication.

The root node feeds a cycle start packet SP (FIG. 13) to the bus at the start point of each cycle. Stored in the start packet SP is the bus time of the root node. On receiving the start packet SP, each node modifies the bus time thereof to adjust the bus time to that of the root node. Therefore, the bus time of the root node is shared among all nodes.

The communication LSI 5 includes, in addition to the clock generator 6 and the communication connector 7, a buffer memory for guaranteeing data 2 in which transmission and reception data items are buffered.

To guarantee data transmitted in the isochronous communication, the data is kept in the buffer memory 2 for a certain period of time. On the occasion, the transmission data is stored at a predetermined address, the data being associated with the bus time at which the data is transmitted.

When the data cannot be normally received by the reception node, a request notifying the condition is sent to the transmission node. In response thereto, the transmission node obtains the data from the buffer memory 2 to send the data again to the reception node. This guarantees the data transmitted.

Figure 1:
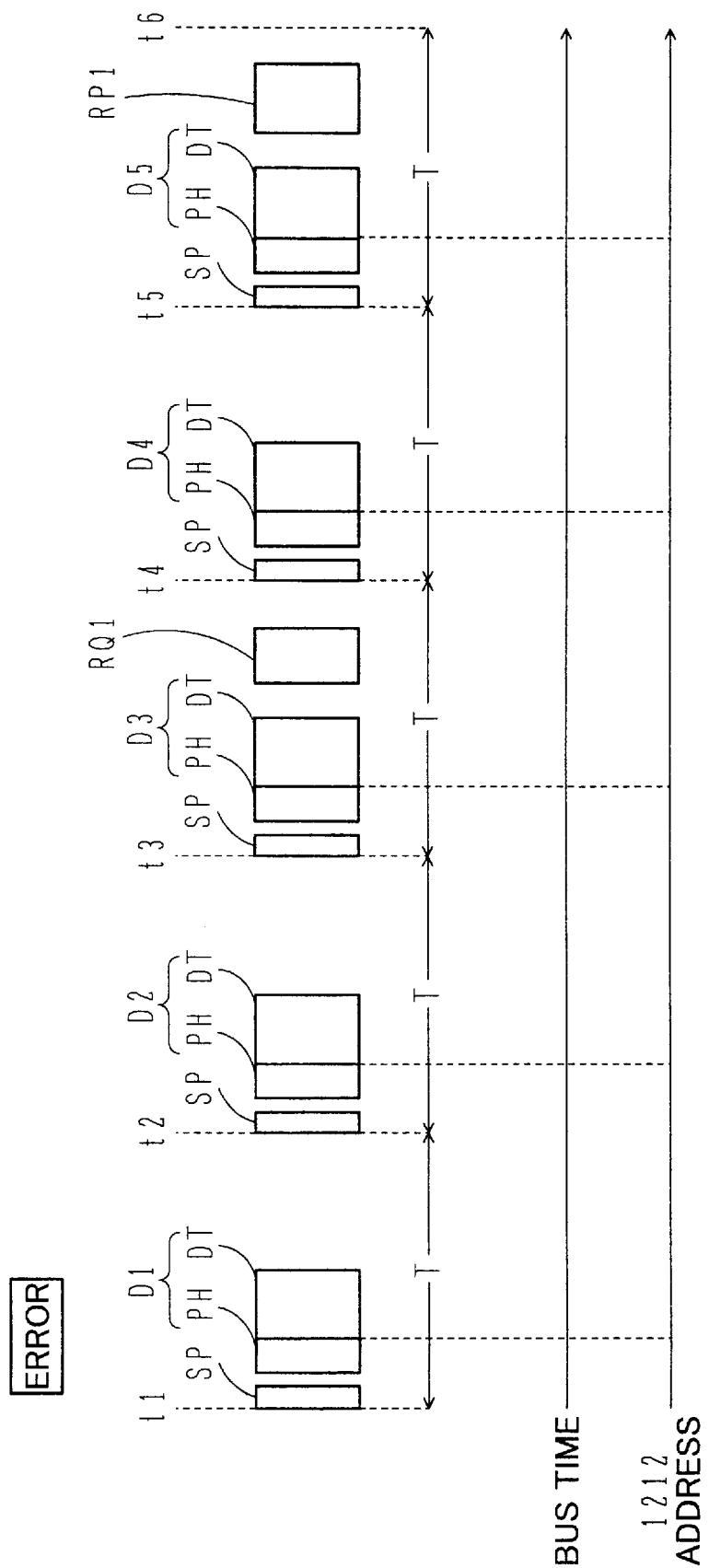
FIG. 1 is a diagram showing a sequence of communication data items in an embodiment according to the present invention.

FIG. 1 shows an example of communication in the embodiment.

The transmission node sends data according to an isochronous communication procedure in which one cycle includes a period of time T (125 µs). For example, the root node delivers at time t1 a cycle start packet SP enabling communication to be started. Detecting the start packet SP, the transmission node feeds a data packet D1 to the bus without designating any communication partner.

The packet D1 includes a packet header PH and a data field DT. Described in the header PH is a data length of the data field DT. In the data field, there are stored data as the object of communication, for example, video signals.

Thereafter, the transmission node sends to the bus a data packet D2 in the cycle beginning at time t2, a data packet D3 in the cycle of time t3, a data packet D4 in the cycle of time t4, and a data packet D5 in the cycle of time t5. Since data of a predetermined data volume can be transmitted for each short period of time, i.e., 125 µs in the isochronous communication, the data can be transmitted almost in a realtime fashion.

The data transmission from the transmission node is conducted without designating the communication partner. In consequence, the data thus transmitted can be received by a plurality of reception nodes. Each reception node decides the kind of received data according to the contents of packet header PH to acquire the data from data field DT of the data packet when necessary.

To guarantee the transmitted data, the transmission node stores the data in a storage area of an address space (to be referred to as a 1212 address herebelow) stipulated in the IEEE1212 standard. The 1212 address is an address space conforming to the communication of the IEEE1394 standard.

Figure 4:
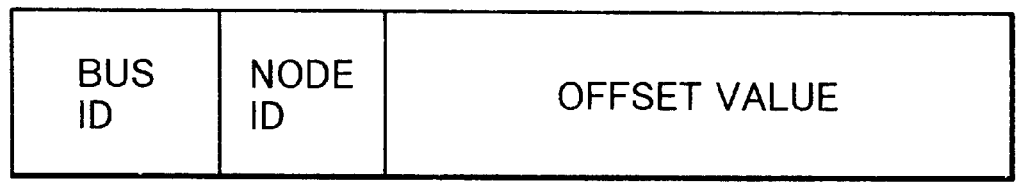
FIG. 4 is a diagram showing the layout of IEEE1212 address.

FIG. 4 shows the layout of 1212 address. The address includes 64 bits, namely, a ten-bit bus identifier (ID), a 6-bit node ID, and a 48-bit offset value. Thanks to the 6-bit node ID, the node can be identified by specifying the 1212 address.

The 1212 address is an address in a virtual memory address space. Namely, all memory space thereof need not be actually installed. All nodes constituting the network can access the 1212 address space.

Returning to FIG. 1, points of time t1 to t5 are information items of time and hence can be represented in terms of bus time common to all nodes. Points of time at which the transmission node respectively sends data packets D1 to D5 can also be denoted respectively by values of bus time. In the communication of a sequence of data items in which the value of bus time of transmission of the first data packet is associated with the value of 1212 address, a data item sent therefrom can be stored in a 1212 address space corresponding to the bus time of transmission of the data. The mapping between the 1212 address space and the values of bus time can be readily established.

A point of time at which a data item sent from the transmission node is received by the reception node is delayed for a period of time of transmission thereof relative to the data transmission time. However, when the transmission node uses a lapse of bus time relative to the starting time of data transmission and the reception node adopts a lapse of bus time relative to the starting time of data reception, it is possible for the transmission and reception nodes to identify the pertinent node. In consequence, when the reception node stores the value of bus time at which the data reception is started to obtain the lapse of bus time relative thereto, it is possible for the reception node to determine positions respectively of data packets D1 to D5 stored in the 1212 address space.

Figure 5:
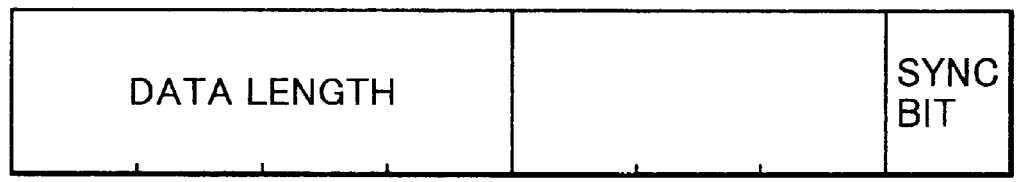
FIG. 5 is a diagram showing the layout of the packet header PH.

To acquire the value of bus time of the start of data reception, the reception node need only use, for example, the packet header PH of the data packet received in the isochronous communication. FIG. 5 shows the layout of packet header PH including 32 bits. In the header PH, the 16 leading bits constitute an area in which the data length of communication data field DT is stored. Furthermore, the four trailing bits are sync bits which can be arbitrarily used by the user. One of the sync bits is employed for the acquisition of the bus time value.

When transmitting a plurality of data packets containing data items of transmission data, the transmission node sets the one of the sync bits to "1" in the header PH of the first data packet and sets the one of the sync bits to "0" in the header PH of the subsequent data packets.

On receiving a data packet, the reception node examines the one of the sync bits of the packet header PH thereof. If the bit is "1", the reception node assumes that the data packet is the data packet containing the first data item of data to be received and then acquires the value of bus time at this point. This value indicates the point of start timing of the communication.

Next, description will be given of a method of guaranteeing data when a reception error occurs in data packet D1 in the reception node.

As shown in FIG. 1, when the reception of data packet D1 fails, the reception node returns a re-transmission request packet RQ1 to the transmission node during a certain period of time, for example, from t3 to t4, in an asynchronous communication to thereby request the re-transmission of data packet D1.

The asynchronous communication will be described. According to the IEEE1394 standard, there can be used the isochronous communication of the synchronous operation and the asynchronous communication of the asynchronous operation in one communication system. To reserve or protect the communication bandwidth of the isochronous communication, the asynchronous communication is asynchronously carried out during a period of time which is not used by the isochronous communication. The communication partner is specified in the asynchronous communication.

The re-transmission request packet RQ1 identifies the data packet D1 to be re-transmitted with an 1212 address, not with the sequential number of data packet D1 relative to the first packet.

Figure 6:
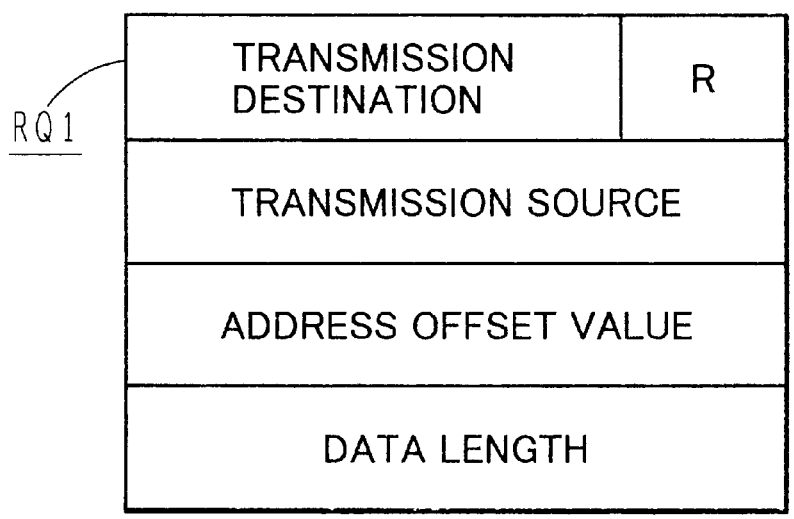
FIG. 6 is a diagram showing a layout example of a re-transmission request packet RQ1 of FIG. 1.

FIG. 6 shows an example of the layout of re-transmission request packet RQ1. In the asynchronous communication, the destination of communication is designated. The packet RQ1 includes, for example, a destination of transmission (node to which the re-transmission request is issued), a source of transmission of packet RQ1 (own node), an offset value of 1212 address (FIG. 4), a data length for re-transmission request (data length of one packet), and a read request R.

On receiving the packet RQ1, the transmission node obtains data DT from the buffer memory 2 (FIG. 3) according to the 1212 address indicated by the packet RQ1. As shown in FIG. 1, the transmission node generates a response packet for re-transmission request RP1 including the data DT and then sends the response packet RP1 to the reception node in the asynchronous communication, during a period of time, for example, between t5 and t6.

Figure 7:
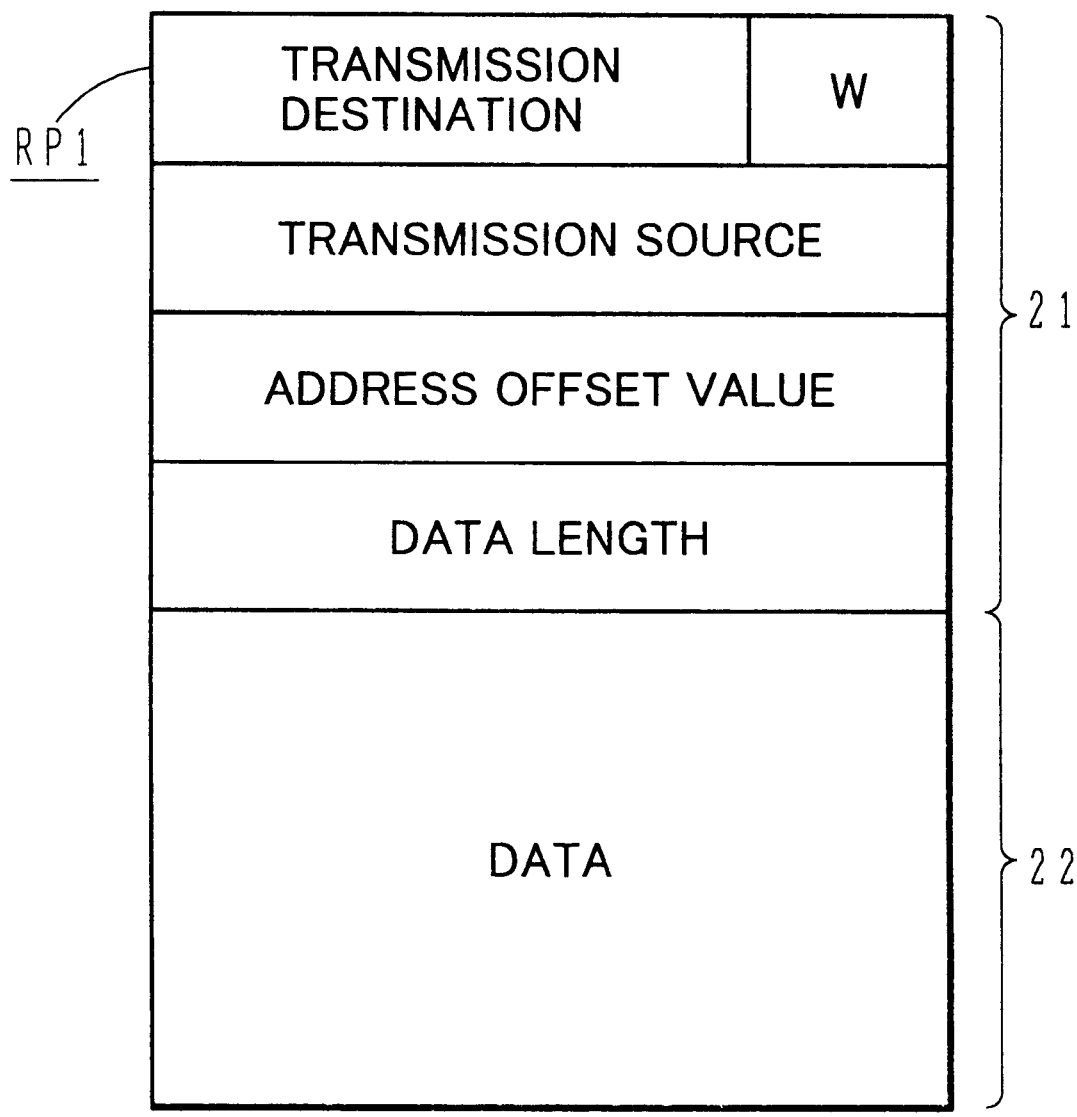
FIG. 7 is a diagram showing a layout example of a re-transmission request response packet RP1 of FIG. 1.

FIG. 7 shows a layout example of response packet for re-transmission request RP1. The packet RP1 includes a header 21 and a data field 22. The data field 22 includes data to be re-transmitted. The header 21 includes, for example, a transmission destination (the node of re-transmission request source), a transmission source of this response packet RP1 (own node), an offset value of 1212 address (FIG. 4), a data length of re-transmission data (data field 22), and a write request W.

When the response packet RP1 is received, the reception node obtains the data from the data field 22 thus received and then writes the data in the own storage area of reception data indicated by the 1212 address specified in the packet RP1.

Figure 8:
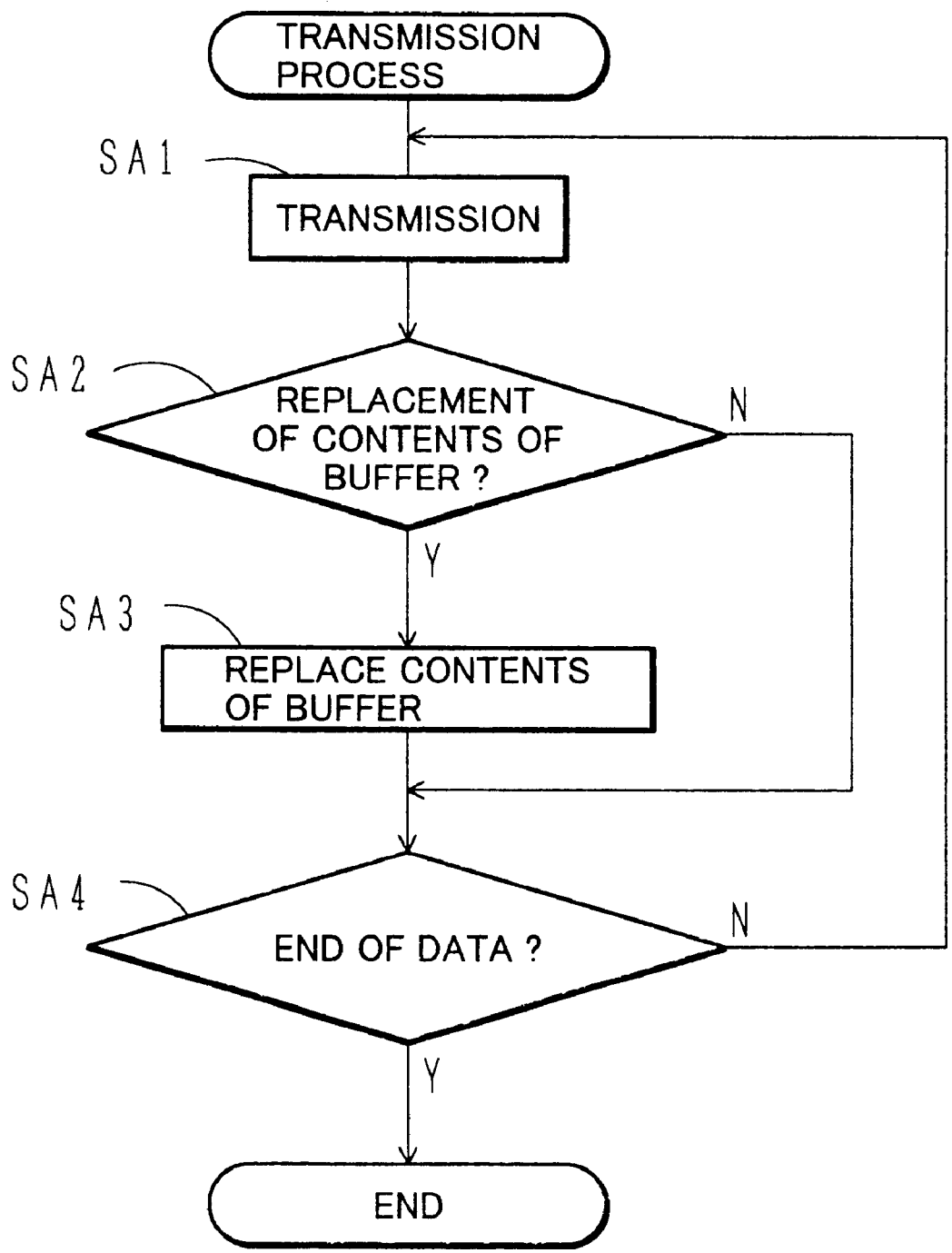
FIG. 8 is a flowchart showing operation of data transmission in a transmission node.

FIG. 8 is a flowchart showing a process of transmission in the transmission node.

In step SA1, the transmission node sends one packet in the isochronous communication. On receiving the cycle start packet SP (FIG. 1), the node obtains data of one packet from the buffer memory for transmission data 2 (FIG. 3), stores the data in the data field DT, adds a packet header thereto, and then sends the resultant packet to the reception node. For example, the data packet D1 shown in FIG. 1 is transmitted from the transmission node.

Figure 9:
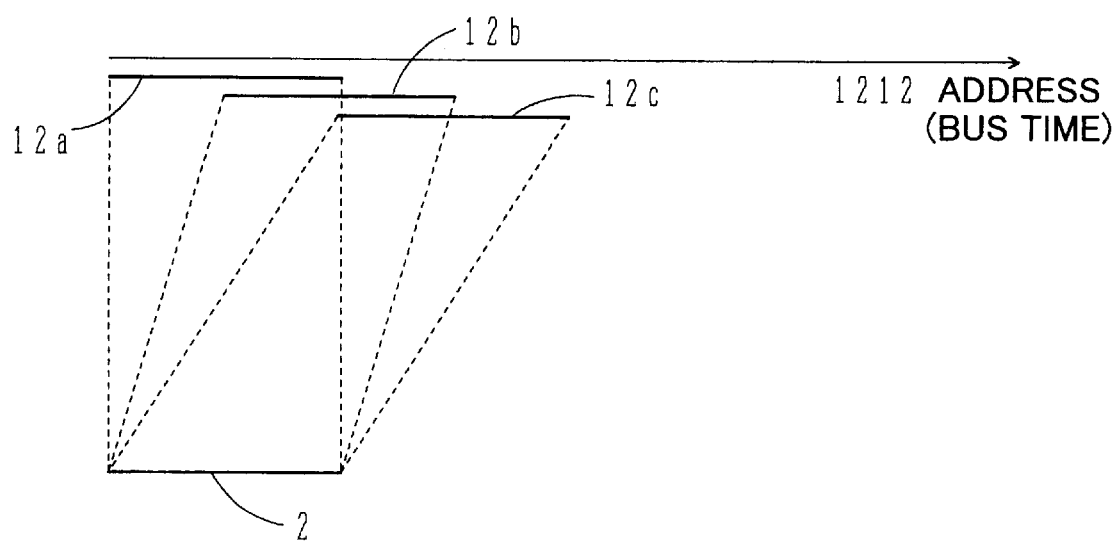
FIG. 9 is a diagram showing a relationship between the 1212 address and a data guaranteeing buffer memory in which transmission data is accumulated.

FIG. 9 shows a correspondence relationship between an area in the 1212 address space and a real address space of the buffer memory 2. Data in the 1212 address space is actually stored, for example, in the RAM 4 (FIG. 3) or on a hard disk. Each position in the 1212 address space can correspond to the bus time. Initially, the buffer memory 2 is loaded with data of an area 12a in a first portion of the 1212 address space. To guarantee data after transmission thereof, the transmitted data is not immediately erased or cleared but is kept in the buffer 2 for a predetermined period of time. In this connection, after the transmission data is loaded in the real address space of the buffer memory 2, a correspondence may be established between the real address space and the 1212 address space.

Returning to FIG. 8, a check is made in step SA2 to decide whether or not the contents of buffer memory 2 are to be modified. If all data stored in the buffer memory 2 has been completely transmitted, control is transferred to step SA3.

In step SA3, the contents of buffer memory 2 are replaced. For example, when data of area 12a of the 1212 address space is stored in the buffer memory 2 as shown in FIG. 9, data of a subsequent area 12b is transferred, for example, from the RAM 4 to the buffer memory 2 in a direct memory access (DMA) operation. The first half portion of the area 12b is overlapped with the last half portion of the area 12a. The last half portion of data in the area 12b transferred to the buffer memory 2 is transmitted. The overlapped portion of data between the areas 12a and 12b has already been transmitted. When this portion is kept in the buffer memory 2, it is possible to re-transmit the first half portion in response to a re-transmission request from the reception node. The amount of data of the overlapped area is the minimum data volume guaranteed.

Each time step SA3 is completely executed, the pertinent area of 1212 address space is shifted by a half width thereof in the sequence of the areas 12a, 12b, and 12c. This operation resultantly changes the correspondence relationship between the buffer memory 2 and the area in the 1212 address space. Each time the relationship is varied, data in the corresponding area of the 1212 address space is transferred to the buffer memory. Thereafter, control is passed to step SA4.

Returning to FIG. 8, when it is decided in step SA2 that the replacement of the contents of buffer memory 2 is unnecessary, namely, when data not transmitted still remains in the buffer memory 2, control is passed to step SA4 without altering the correspondence relationship between the buffer memory 2 and the 1212 address space.

In step SA4, a check is made to determine whether or not all data of the 1212 address space has been completely transmitted. If there remains data to be transmitted, control is returned to step SA1 to transmit the next data. If all data of the 1212 address space has been transmitted, this processing is terminated.

Figure 10:
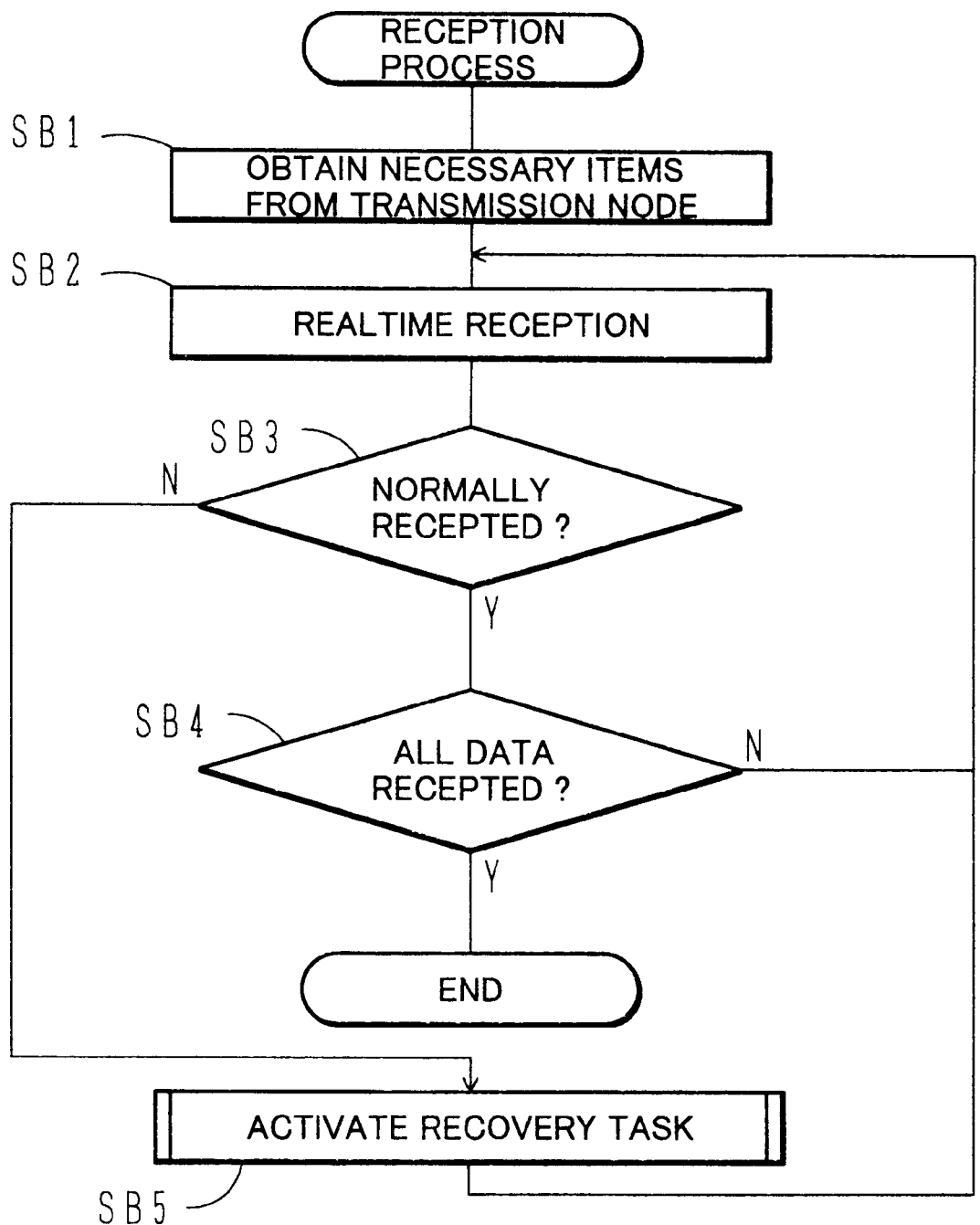
FIG. 10 is a flowchart showing operation of data reception in a reception node.

FIG. 10 shows in a flowchart the data receiving operation of the reception node.

In step SB1, the reception node conducts initialization thereof to start communication is started. Namely, the reception node acquires from the transmission node such items (conditions for transmission) necessary for the asynchronous communication as described below. The transmission node sets the conditions for transmission in the RAM 4 (FIG. 3) and then maps the real addresses of RAM 4 onto the 1212 address space. The reception node reads through the asynchronous communication the conditions for transmission thus stored in the 1212 address space.

(1) Start Timing

The transmission node beforehand sets to the 1212 address a point of bus time for the start timing of transmission. The reception node reads the bus time in the asynchronous communication to obtain the start timing. The start timing indicates a position on the time axis (bus time) corresponding to the first packet.

Additionally, the reception node may check the one bit of the sync bits (FIG. 5) in the packet header PH received in the isochronous communication. When the one of the sync bits is "1", the packet data indicates the start of transmission as described above. Consequently, the bus time at the point can be set as the start timing.

(2) Start Address

To recognize the correspondence between the value of bus time to a position in the 1212 address space, the reception node acquires the start address of an area in which the transmission data is stored in the 1212 address space. The start address designates a position in the address space on which the position of the start timing on the time axis is mapped.

(3) Packet Size and Total Data Size

The packet size is the size (data length) of the data field DT of one data packet transmitted in the isochronous communication. For example, the packet size indicates the size of one data field DT shown in FIG. 1. The total data size is the size of overall data transmitted in the isochronous communication.

The value obtained by dividing total data size by the packet size (total data size/packet size) indicates the number of packets, namely, the number of isochronous communications required to transmit the overall data. According to the number of isochronous communications thus attained, the end timing can be calculated. In a range from the start timing to the end timing, there is achieved a process of guaranteeing data communicated.

(4) Number of Packets Being Guaranteed

The number of packets being guaranteed indicates the number of last transmitted packets which can be re-transmitted. This corresponds to the data length of the overlapped portion between the areas 12a and 12b in the 1212 address shown in FIG. 9.

Returning to the flowchart of FIG. 10, a realtime data reception is conducted in the isochronous communication in step SB2. One data packet is received in this operation. For example, the data packet D1 shown in FIG. 1 is received.

In step SB3, a check is made to decide whether or not the data is normally received. For example, the data length stored in the packet header PH is compared with that of the data field DT actually received. If the reception is normally accomplished, control is transferred to step SB4.

In step SB4, a check is made to determined whether or not all data has been received, namely, all packets have already been received. If there remain any packets to be received, control is returned to step SB2 to repeatedly conduct the realtime data reception for the next packet. Otherwise, this process is terminated.

In this regard, when it is determined in step SB3 that the data is not normally received, control is passed to step SB5 to invoke a recovery task to issue a re-transmission request. The processing of recovery task will be later described by referring to FIG. 11. Thereafter, control is returned to step SB2 to repeatedly accomplish the realtime data reception for the next packet.

Figure 11:
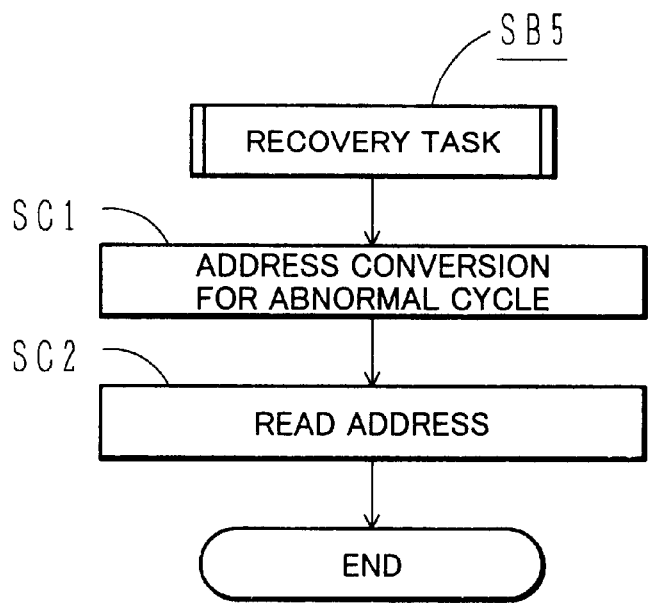
FIG. 11 is a flowchart showing in detail operation of a recovery tank in step SB5 of FIG. 10.

FIG. 11 is a flowchart showing in detail the recovery task in step SB5 of FIG. 10.

In step SC1, an address conversion is achieved for the abnormal cycle. The reception node obtains the bus time at which the normal reception failed and then calculates a 1212 address according to the difference between the bus time and the start timing (bus time at the start of transmission).

In step SC2, the reception address sends a re-transmission request indicating a data read operation at the attained 1212 address to the transmission node. For example, a re-transmission request packet RQ1 is sent to the transmission node in the asynchronous mode as shown in FIG. 1. The process is then terminated. On receiving the request, the transmission node conducts processing as follows.

Figure 12:
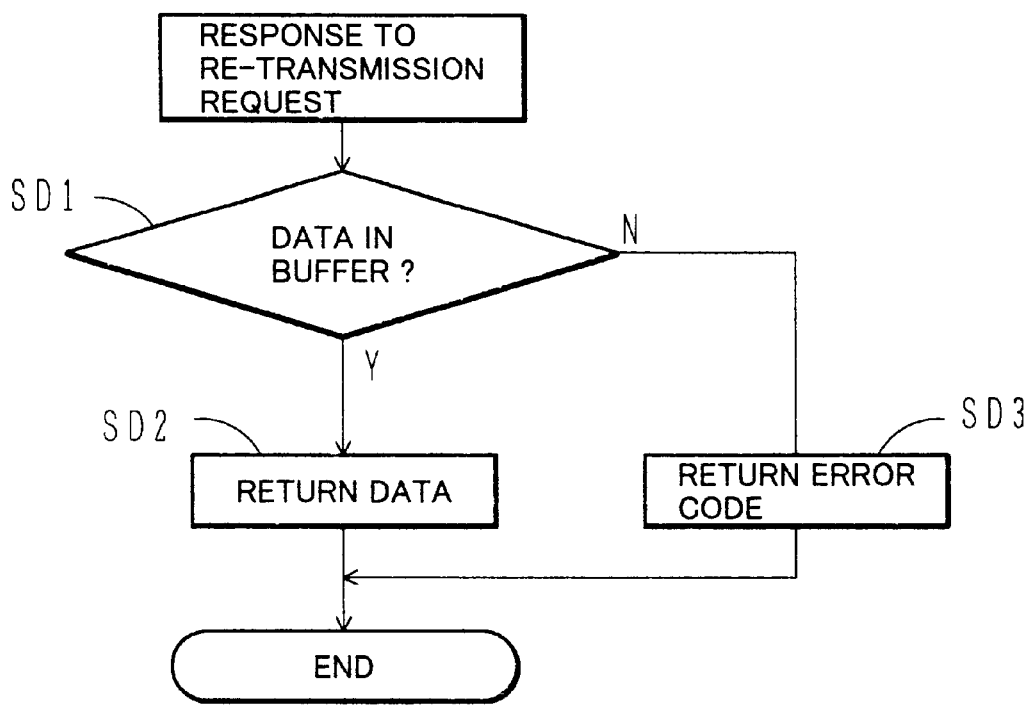
FIG. 12 is a flowchart showing a process achieved when the transmission node receives the re-transmission request packet RQ1.

FIG. 12 shows in a flowchart the process executed by the transmission at reception of the re-transmission request packet RQ1.

In step SD1, a check is made to decide whether or not the data as the objective data of the re-transmission request exist in the memory buffer 2. The objective data is specified by the 1212 address. If the data is found in the buffer 2, control is transferred to step SD2.

In step SD2, the pertinent data is read from the buffer memory 2 to be re-transmitted to the reception node. For example, as can be seen from FIG. 1, the response packet for re-transmission request RP1 is sent to the reception node. Thereafter the process is terminated.

When it is determined in step SD1 that the objective data is missing in the memory 2, control is passed to step SD3. In this step, to notify impossibility of re-transmission of the objective data, an error code is returned to the reception node in the asynchronous mode. The process is then terminated.

As described above, the transmission node saves, in the memory buffer 2, data the amount of which is equal to or more than that of transmitted data corresponding to the number of data packets guaranteed. There is established a state in which a mapping operation is enabled between the time information (bus time) and the address information (1212 address). At a reception error, the reception node issues a re-transmission request of data related to the error with specification of an address in the 1212 address space, not the sequential number of packet. In other words, the re-transmission request from the reception node corresponds to an operation to read data from the 1212 address space.

Additionally, ordinary data is communicated in the synchronous mode. In contrast therewith, the re-transmission request and the response thereto are carried out in the asynchronous mode. Therefore, even when a re-transmission request is issued, the bandwidth of synchronous communication is not restricted and the data can be guaranteed without interrupting the synchronous communication. Moreover, the data can be guaranteed even if the synchronous communication is effected in a protocol not including the handshake.

In the reception of data sent from the transmission node, the reception error does not necessarily occur in all nodes of the network. The error may take place in some reception nodes depending on cases. According to the embodiment, only the reception nodes in which the error is detected can issue the re-transmission request. Even when a reception error occurs in a plurality of reception nodes for data sent from a transmission node and hence the reception nodes issue re-transmission requests to the transmission node, the transmission node can respond to each of the re-transmission requests.

Subsequently, description will be given another embodiment of the present invention capable of conducting data communication without deteriorating the realtime characteristic thereof.

Figure 14:
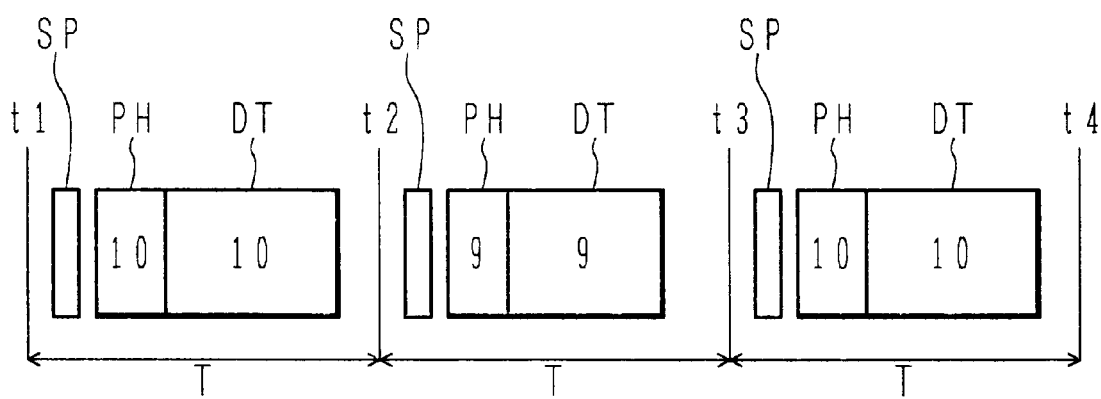
FIG. 14 is a diagram showing an example of isochronous communication in conformity with IEEE1394 in an embodiment according to the present invention.

FIG. 14 shows an example of the isochronous communication conforming to IEEE1394 in another embodiment according to the present invention.

A cycle start packet SP indicates the start of one cycle having a predetermined period of time T (=125 $\mu$m). The root node ND shown in FIG. 2 generates and transmits the cycle start packet SP and nodes ND1 to ND4 receive the packet SP.

The packet SP is an indication of granting the start of transmission. Detecting the packet SP, each node ND can send a data packet including a packet header PH and a data field DT.

In FIG. 14, on detecting the packet SP at time t1, a transmission node ND conducts a check to decide whether or not the data length of data accumulated in the buffer is equal to or more than the maximum data length. The maximum data length is set to, for example, ten bytes. In the data length field of packet header PH, there is automatically stored a value indicating the maximum data length (ten bytes) in advance. When the length of accumulated data is equal to or more than the maximum data length (ten bytes), the first ten-byte data (of the maximum data length) is obtained from the data which is stored in the buffer and which is not transmitted therefrom. The data is then stored in the data field DT to create a data packet and the resultant data packet is thereafter transmitted.

Subsequently, when the cycle start packet SP at time t2 is detected, the transmission node ND similarly checks to determine whether or not the data length of data accumulated in the buffer is equal to or more than the maximum data length (ten bytes). When the length of accumulated data is equal to nine bytes, namely, when data the length of which is equal to or more than the maximum data length (ten bytes) is missing in the buffer, the value of the data length field of packet header PH is altered to indicate nine bytes to thereby generates an appropriate packet header. Thereafter, the first nine-byte data is obtained from the data which is stored in the buffer and which is not transmitted therefrom. The data is then stored in the data field DT to produced a data packet and the resultant data packet is thereafter transmitted. There may be generated for transmission a data packet including data the length of which is less than that of data (nine bytes) accumulated in the buffer. For example, there may be generated a packet including a eight-byte data. In this case, the value of the data length field is accordingly modified to indicate eight bytes in the packet header PH.

Next, on detecting the packet SP at time t3, the transmission node accomplishes a check to decide whether or not the data length of data accumulated in the buffer is equal to or more than the maximum data length (ten bytes). When the length of accumulated data is equal to or more than the maximum data length (ten bytes), the transmission node ND produces a packet header PH including a data length field indicating the maximum data length (ten bytes). The node ND then attains the first ten-byte data (of the maximum data length) from the data which is stored in the buffer and which is not transmitted therefrom and then stores the data in the data field DT to create a data packet. The node ND thereafter transmits the data packet.

Figure 13:
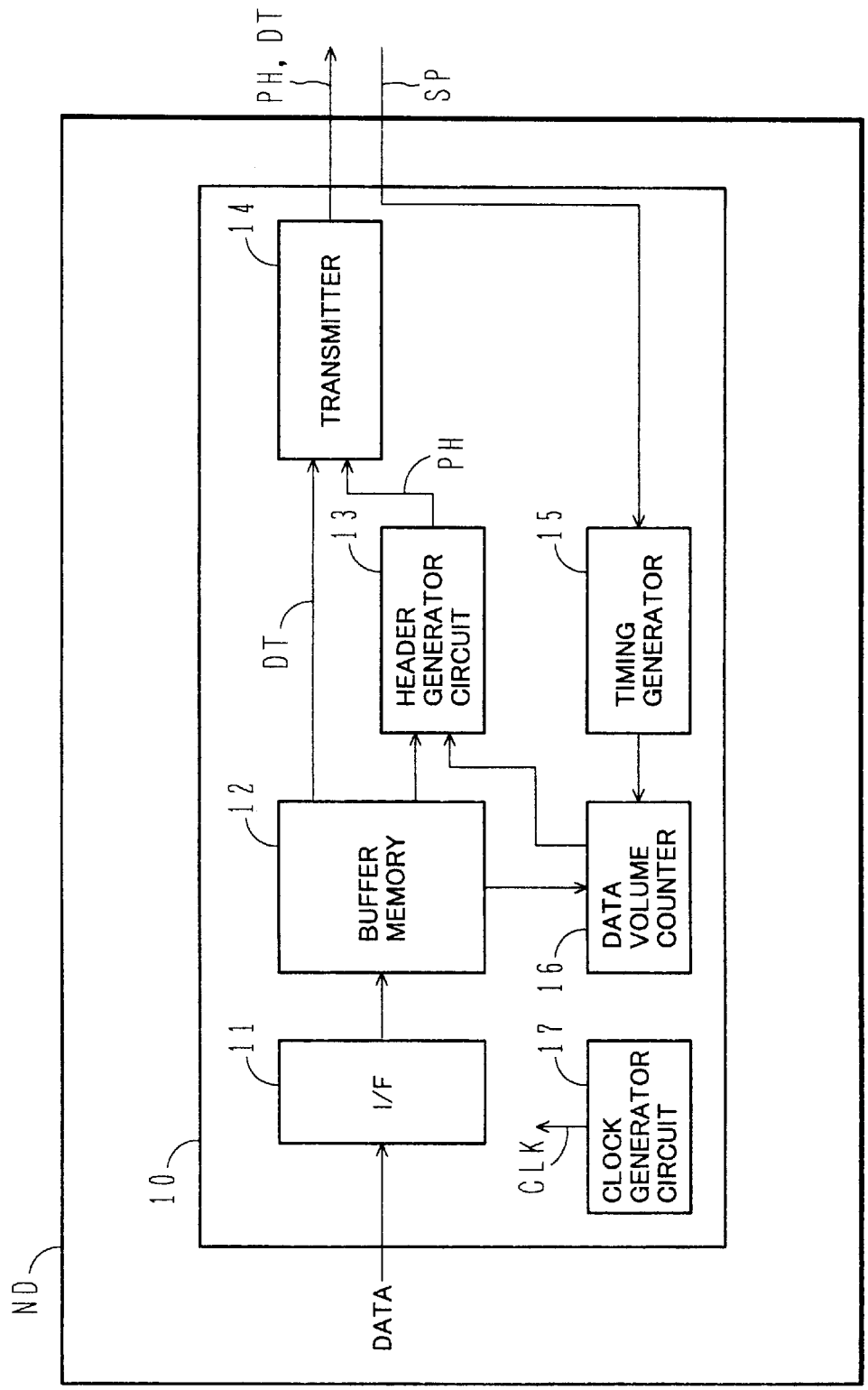
FIG. 13 is a block diagram showing the configuration of data transmission nodes in another embodiment according to the present invention.

FIG. 13 is a block diagram showing the configuration of another embodiment of the data communication system according to the present invention.

A node ND indicates one of the five nodes ND1 to ND5 constituting the data communication system shown in FIG. 2. For example, the node ND is an audio apparatus or a video apparatus. The node ND includes a communication unit 10 for transmitting or receiving digital data to or from an external apparatus. In conjunction with this embodiment, description will be given of a case in which digital data is transmitted to the external apparatus.

The communication block 10 includes an interface (I/F) section 11 for achieving a format conversion to transform input data into digital data having a predetermined format, a buffer memory 12 for accumulating therein the digital data, a header generator circuit 13 for generating a packet header PH, a transmitter 14 for sending the packet header PH and a data field DT to the external apparatus, a timing generator 15 for establishing synchronization with the cycle start packet SP, a data amount counter 16 for measuring the amount of data stored in the buffer memory 12, and a clock generator circuit 17 for generating a clock signal CLK for the operations of the constituent components above.

The interface section 11 converts the digital data according to a predetermined format to deliver the resultant digital data to the buffer memory 12. The memory 12 buffers the digital data supplied from the interface section 11 and then outputs the buffered data to the transmitter 14 in a first-in-first-out mode.

Timing at which the buffer memory 12 outputs the buffered data to the transmitter 14 will be described later.

Description will now be given of a case in which the node is other than the root node. The node ND receives the cycle start packet SP via the communication bus from the root node. The timing generator 15 synchronizes the cycle start packet SP with the clock signal CLK thereof and then sends the resultant packet SP to the data amount counter 16.

On receiving the signal from the timing generator 15, the counter 16 delivers the amount of data accumulated in the buffer memory 12 to the header generator 13. The generator 13 receives the amount of data accumulated in the buffer memory 12, the amount being determined when the packet SP is supplied to the node ND.

The header generator 13 beforehand generates a packet header PH including a data length field indicating the maximum data length (e.g., ten bytes). Thereafter, when the cycle start packet is supplied, the header generator 13 checks to decide whether or not the data length of data accumulated in the buffer memory at the point of time is equal to or more than the maximum data length. If this is the case, the packet header PH produced above is directly fed to the transmitter 14.

On the other hand, if the data length of data accumulated in the memory 12 is less than the maximum data length, the value of the data length field of the header PH is changed into the data length of data accumulated in the memory 12. The obtained header PH is then delivered to the transmitter 14.

If the data length of data in the memory 12 is equal to or more than the maximum data length when the cycle start packet SP is received from the external apparatus, data having the maximum data length is fed to the transmitter 14.

On the other hand, if the data length of data in the memory 12 is less than the maximum data length when the cycle start packet SP is supplied from the external device, data accumulated in the memory 12 is fed to the transmitter 14. The data fed to the transmitter 14 is not the data having the maximum data length. The transmitter 14 combines the packet header PH with the data field DT into a data packet and then sends the obtained data packet to the external device.

In this connection, if the data length of data in the memory 12 is less than the maximum data length, the data length described in the packet header is not limited to the amount of data accumulated in the memory 12. Namely, the data length may be equal to or less than the data length corresponding to the amount of data in the memory 12.

The node ND sequentially supplies transmission data to the communication unit 10. On receiving the data, the communication unit 10 creates a packet header PH according to the received data and then transmits the packet header PH and the data field DT at a predetermined timing. It is unnecessary for the CPU external to the communication unit 10 to achieve the process to generate the packet header PH or the process to control the data length. Therefore, multimedia information such as audio data can be easily transmitted.

As above, according to the amount of data accumulated in the buffer memory 12 at reception of the packet SP, the value of the data length field is appropriately varies in the packet header PH. Resultantly, the data length described in the header PH matches that of data in the data field DT to be actually transmitted.

Additionally, even when the data length of data in the buffer memory 12 is less than the maximum data length, the data thus accumulated therein up to the point of time is transmitted and hence the realtime characteristic of data communication is kept unchanged.

In this regard, assume that the node ND is the root node. The node ND generates the cycle start packet SP. Consequently, it is only necessary for the node ND to input the packet SP to the timing generator 15.

Moreover, the present embodiment is applicable also to digital communication conforming to standards other than the IEEE1394 standard. The cycle start packet is equivalent to a signal to indicate timing of the start of transmission (timing to grant the start of transmission). In a general communication procedure, the amount of data accumulated in the buffer memory need only be detected at detection of the transmission start signal such that the data length in the header is altered according to the amount of data in the buffer.

In addition, assume there is achieved a communication procedure in which it is unnecessary to beforehand set the maximum data length. Since the header indicating the maximum data length is not required to be generated in advance, the amount of data accumulated in the buffer memory need only be set to the header for transmission each time the transmission start signal is detected.

In the embodiment above, at detection of the cycle start packet, the amount of data stored in the buffer memory 12 is decided such that the header length field is modified in the packet header PH according to the amount of data thus determined. Next, description will be given of an example in which timing of an interruption signal created by a timer is utilized as the criterion. Namely, timing of the cycle start packet SP is not employed as the criterion.

Figure 15:
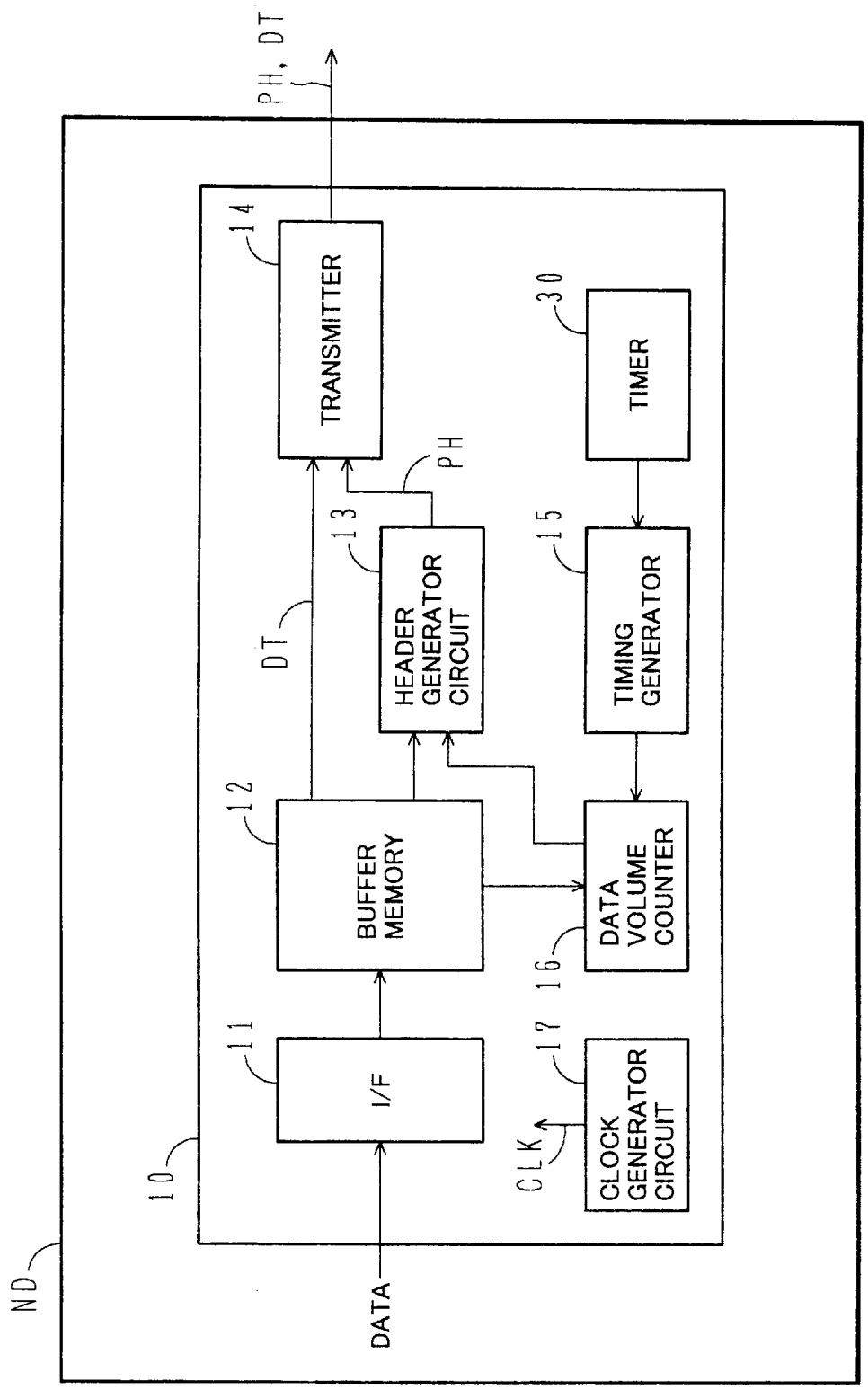
FIG. 15 is a block diagram showing the configuration of data transmission nodes in still another embodiment according to the present invention.
Figure 16:
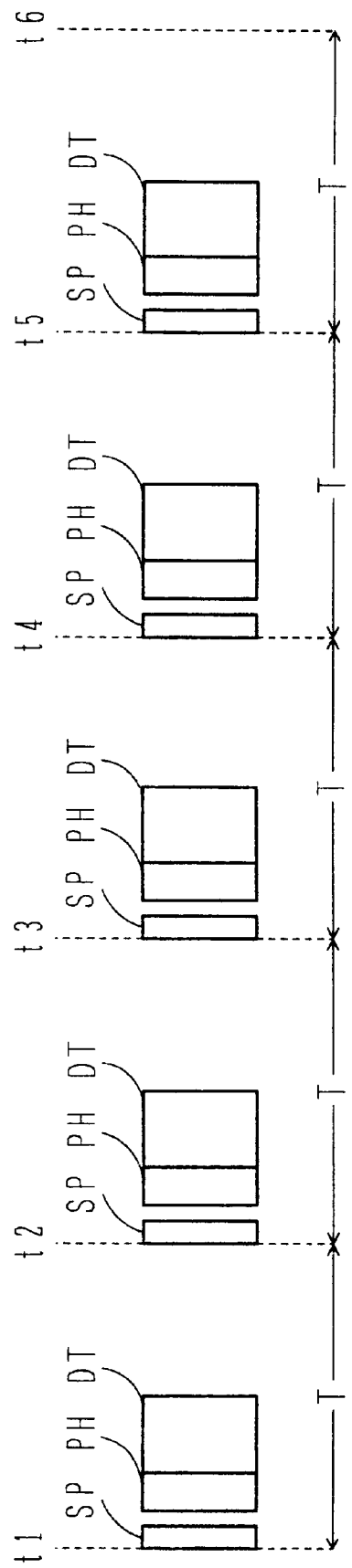
FIG. 16 is a diagram showing an example of isochronous communication conforming to the IEEE1394 standard.
Figure 17A:
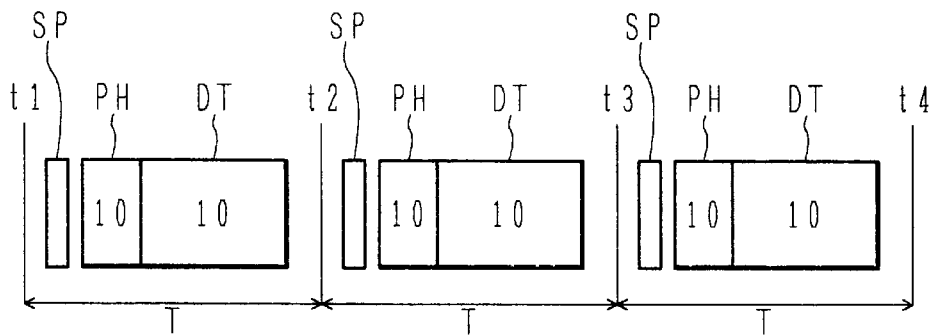
FIGS. 17A to 17C are diagrams showing an example of isochronous communication in conformity with IEEE1394 in the prior art.
Figure 17B:
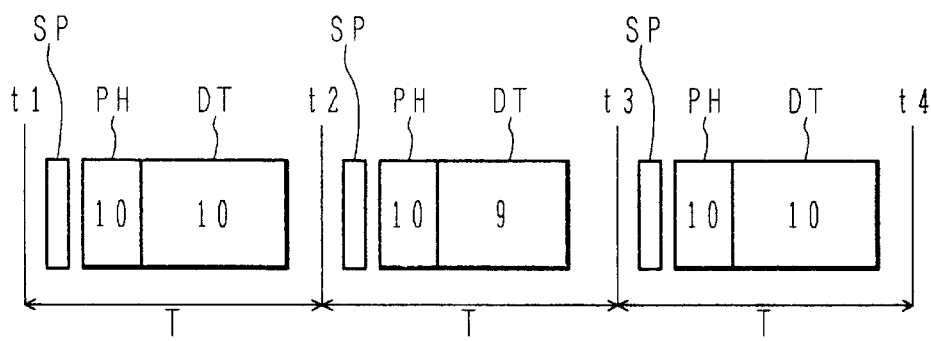
Figure 17C:
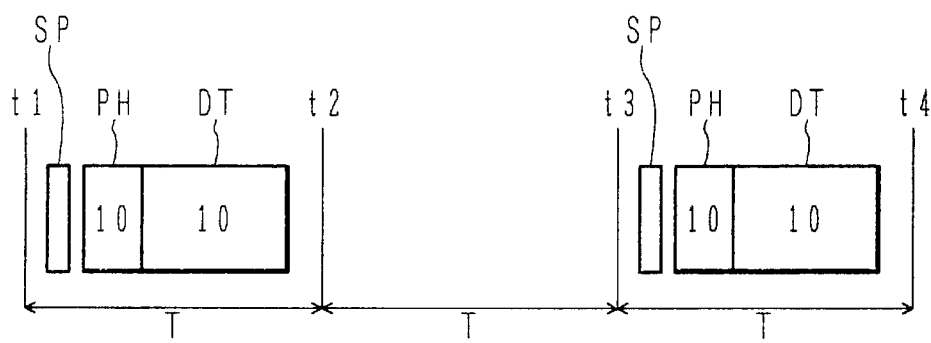

FIG. 15 shows in a block diagram the configuration of further another embodiment of the data communication system according to the present invention.

This embodiment is almost the same as the embodiment described above (FIG. 13) excepting that an interruption signal generated from a timer 30 is inputted in place of the cycle start packet SP to the timing generator 5.

The timer 30 counts clock signals CLK to create an interruption signal which provides timing similar to timing of the cycle start packet SP. In this regard, the interruption signal need only be produced at a predetermined period of interval T shown in FIG. 14. The timing thereof may be the same as that of the packet SP or the interval of time T may be less than that of the packet SP.

Furthermore, when the timer 30 is an internal timer of the communication block 10 and the interruption signal created from the timer 30 is already synchronized, the timing generator 15 may be dispensed with such that the interruption signal is directly supplied from the timer 30 to the data volume counter 16.

Additionally, it may also possible that the timing generator 15 is supplied with an interruption signal created from an external timer in place of the interruption signal created from the timer 30.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A data communication method for use with a communication network including transmission nodes and reception nodes connected thereto in which the transmission and reception nodes are controlled with respect to time according to bus time information shared between the transmission and reception nodes, comprising the steps of:

(a) periodically transmitting, by the transmission nodes data while maintaining a free period of time between periodic transmissions of data;

(b) determining, by the reception node, whether data received from the transmission node by the reception node is abnormal;

(c) transmitting to the transmission node, by the reception node, during the free period of time, when the reception node determines that the data received from the transmission node is abnormal, a re-transmission request signal identifying bus time of the abnormal data reception; and (d) re-transmitting, by the transmission node, during the free period of time, when the re-transmission request signal is received by the transmission node, data previously transmitted in the bus time identified by the re-transmission request signal.

2. A data communication method according to claim 1, wherein a virtual address space is defined for the transmission and reception nodes in a shared manner;

wherein the method further comprises the steps of, prior to step (a):

establishing, by the transmission node, a correspondence between the addresses in the virtual address space and the bus time; and transmitting by the transmission node, to the reception node a correspondence relationship between the addresses in the virtual address space and the bus time;

wherein the step (a) further comprises storing the transmitted data with a correspondence established between the transmitted data and an address in the virtual address space corresponding to the bus time of the data transmission; and wherein in the step (c), the re-transmission request signal indicates an address in the virtual address space corresponding the bus time at the abnormal data reception; and wherein in the step (d), the data re-transmitted by the transmission node to the reception node corresponds to the address in the virtual address space specified by the re-transmission request signal.

3. A data communication method according to claim 2, wherein:

the step of establishing a correspondence between the addresses in the virtual address space and the bus time further comprises establishing a correspondence between start timing as the bus time of start of data transmission and a start address in the virtual address space;

the step of transmitting the corresponding relationship between the addresses in the virtual address space and the bus time further comprises transmitting the start timing and the start address to the reception node; and the step (c) further comprises determining the address in the virtual address space corresponding to the bus time at which the abnormal data is received based on a difference between the bus time at which the abnormal data is received and the start timing.

4. A data communication method according to claim 2, wherein:

the step of establishing a correspondence between the addresses in the virtual address space and the bus time further comprises establishing a correspondence between start timing as the bus time of start of data transmission and a start address in the virtual address space;

the step of transmitting the corresponding relationship between the addresses in the virtual address space and the bus time further comprises transmitting the start address to the reception node;

the step (a) further comprises notifying, during a cycle of transmitting a first data item of data to be transmitted, the reception node that the data transmitted during the cycle includes the first data item;

the step (b) further comprises storing, when the reception node is notified that the received data includes the first data item, the bus time at which the data including the first data item is received as start timing; and the step (c) further comprises determining the address in the virtual address space corresponding to the bus time at which the abnormal data is received based on a difference between the bus time at which the abnormal data is received and the start timing.

5. A data transmission method, comprising the steps of:

transferring to a buffer memory a portion of a consecutive data string to be transmitted;

sequentially transmitting the data string transferred to the buffer memory; and maintaining a portion of the transmitted data string in the buffer memory for a predetermined period of time after transmission so that the data string may be re-transmitted if a transmission or data error is detected at a receiving terminal.

6. A data transmission method for use with a digital communication network for establishing connections between transmission nodes for transmitting data and reception nodes for receiving the transmitted data, comprising the steps of:

transmitting to the reception node, by the transmission node, data according to a protocol in a synchronous mode and accumulating by the transmission node, the transmitted data in a buffer memory;

determining, when the transmitted data cannot be normally received by the reception node, time information regarding abnormal reception, mapping the time information onto address information, and transmitting the address information to the transmission node according to a protocol in an asynchronous mode to thereby request re-transmission of the data not normally received; and reading, by the transmission node, when the address information is received by the transmission node, data from the buffer memory according to the address information and re-transmitting the data read from the buffer memory to the reception node according to a protocol in an asynchronous mode.

7. A data communication method for use with a reception node for receiving data in a digital communication network, comprising the steps of:

determining, when data transmitted from an external apparatus according to a protocol in a synchronous mode is not normally received by the reception node, time information regarding the abnormal reception;

mapping the time information onto address information; and transmitting the address information to the external apparatus according to a protocol in an asynchronous mode to thereby request re-transmission of the data not normally received.

8. A transmission node in a data communication system for digital communication, comprising:

means for transmitting data according to a protocol in a synchronous mode and accumulating the transmitted data in a buffer memory;

means for reading, when a re-transmission request including address information is received from an external apparatus, data from the buffer memory according to the address information;

receiving means for receiving data according to the address information; and means for determining, when data is not normally received by the receiving means, time information regarding abnormal reception, mapping the time information onto address information, and returning to the external apparatus the address information according to a protocol in an asynchronous mode to thereby request re-transmission of the data not normally received.

9. A data communication system for digital communication, comprising:

receiving means for receiving data according to address information; and means for acquiring, when data is not normally received by the receiving means, time information regarding abnormal reception, mapping the time information onto address information, and transmitting the address information according to a protocol in an asynchronous mode to thereby request retransmission of the data not normally received.

10. A data communication system, comprising:

a buffer memory for buffering data to be transmitted;

header generating means for generating in a data length field a header in which a first data length is described;

timing detecting means for detecting a timing signal supplied at a predetermined interval of time;

data length detecting means for detecting, when the timing signal is detected, a data length of data buffered in the buffer memory, the data length being detected as a second data length;

header transmitting means for converting, when the second data length thus detected is less than the first data length, a value of the data length field of the header generated by the header generating means into a data length equal to or less than the second data length and transmitting, when the second data length thus detected is equal to or more than the first data length, the header generated by the header generating means without converting the value thereof; and data transmitting means for obtaining from the buffer memory data having a data length equal to that described in the data length field of the transmitted header and transmitting the data.

11. A data communication method, comprising the steps of:

generating a header including a data length field in which a first data length is described;

detecting, each time a timing signal supplied at a predetermined interval of time is detected, a data length of data buffered in a buffer memory, the data length being detected as a second data length;

converting, when the second data length thus detected is less than the first data length, a value of the data length field of the generated header into a data length equal to or less than the second data length and transmitting, when the second data length thus detected is equal to or more than the first data length, the generated header without converting the value thereof; and obtaining from the buffer memory data having a data length equal to that described in the data length field of the transmitted header and transmitting the data.

* * * * *